(12) United States Patent
Sorensen et al.

(10) Patent No.: US 8,480,789 B2
(45) Date of Patent: Jul. 9, 2013

(54) LANDFILL GAS PURIFICATION METHOD AND SYSTEM

(75) Inventors: Cary V. Sorensen, Knoxville, TN (US); Jeffrey R. Bailey, Knoxville, TN (US)

(73) Assignee: Manufactured Methane Corporation, Knoxville, TN (US)

( * ) Notice: Subject to any disclaimer, the term of this patent is extended or adjusted under 35 U.S.C. 154(b) by 372 days.

(21) Appl. No.: 12/903,366

(22) Filed: Oct. 13, 2010

(65) Prior Publication Data

US 2011/0023710 A1    Feb. 3, 2011

Related U.S. Application Data

(63) Continuation-in-part of application No. 11/775,410, filed on Jul. 10, 2007, now Pat. No. 7,815,713.

(51) Int. Cl.
*B01D 53/02*    (2006.01)
(52) U.S. Cl.
USPC ........... 95/50; 95/96; 95/143; 96/130; 55/338
(58) Field of Classification Search
USPC ................. 95/50, 96, 143; 96/4, 130; 55/338
See application file for complete search history.

(56) References Cited

U.S. PATENT DOCUMENTS

| | | | |
|---|---|---|---|
| 4,238,204 A | 12/1980 | Perry | |
| 4,398,926 A | 8/1983 | Doshi | |
| 4,645,516 A | 2/1987 | Doshi | |
| 4,654,063 A | 3/1987 | Auvil et al. | |
| 4,681,612 A | 7/1987 | O'Brien et al. | |
| 4,701,187 A | 10/1987 | Choe et al. | |
| 4,783,203 A | 11/1988 | Doshi | |
| 5,116,396 A | 5/1992 | Prasad et al. | |
| 5,207,806 A | 5/1993 | Lagree et al. | |
| 5,240,472 A | 8/1993 | Sircar | |

(Continued)

FOREIGN PATENT DOCUMENTS

| | | |
|---|---|---|
| EP | 0 804 272 B1 | 2/2002 |
| EP | 1 811 011 A1 | 7/2007 |
| FR | 2836058 A1 | 8/2003 |

OTHER PUBLICATIONS

Kent S. Knaebel and Herbert E. Reinhold, Landfill Gas: From Rubbish to Resource, Adsorption Research, Inc. Dublin, OH 43016-1200, USA, Dec. 14, 2002, Adsorption 9:87-94, 2003, copyright 2003 Kluwer Academic Publishers, manufactured in the Netherlands, pp. 87-94.

*Primary Examiner* — Robert A Hopkins
(74) *Attorney, Agent, or Firm* — Luedeka Neely Group, P.C.

(57) ABSTRACT

The present disclosure provides a method for separating and purifying a landfill gas stream. In one embodiment, the method includes a step of collecting a crude landfill gas stream which includes at least methane, carbon dioxide, oxygen, and nitrogen gases. The method also includes a step of separating the crude landfill gas stream into at least an intermediate landfill gas stream and a first waste gas stream using a membrane separation unit, wherein the intermediate landfill gas stream is enriched in methane and depleted in carbon dioxide relative to the crude landfill gas stream. The method further includes a step of separating the intermediate landfill gas stream into at least a final landfill gas stream and a second waste gas stream using a pressure swing adsorption separation unit, wherein the final landfill gas stream is enriched in methane and depleted in carbon dioxide, oxygen, and nitrogen relative to the intermediate landfill gas stream. The first and second waste gas streams are collected to form a fuel composition and the fuel composition is delivered to a generator unit so that the fuel composition may be used to produce electricity.

25 Claims, 2 Drawing Sheets

U.S. PATENT DOCUMENTS

| | | |
|---|---|---|
| 5,332,424 A | 7/1994 | Rao et al. |
| 5,354,547 A | 10/1994 | Rao et al. |
| 5,411,721 A | 5/1995 | Doshi et al. |
| 5,727,903 A | 3/1998 | Borray et al. |
| 6,071,326 A | 6/2000 | Hall |
| 6,179,900 B1 | 1/2001 | Behling et al. |
| 6,197,092 B1 | 3/2001 | Butwell et al. |
| 6,315,817 B1 | 11/2001 | Butwell et al. |
| 6,444,012 B1 | 9/2002 | Dolan et al. |
| 6,497,750 B2 | 12/2002 | Butwell et al. |
| 6,610,124 B1 | 8/2003 | Dolan et al. |
| 7,025,803 B2 | 4/2006 | Wascheck et al. |
| 7,731,779 B2 | 6/2010 | Palumbo |
| 2004/0099138 A1 | 5/2004 | Karode |
| 2006/0248921 A1 | 11/2006 | Hosford et al. |

LANDFILL GAS PURIFICATION METHOD AND SYSTEM

CROSS REFERENCE TO RELATED APPLICATIONS

This patent application claims priority from and is a Continuation-in-Part of U.S. patent application Ser. No. 11/775,410 filed Jul. 10, 2007, entitled "LANDFILL GAS PURIFICATION METHOD AND SYSTEM," which is incorporated herein by reference in its entirety.

FIELD

This disclosure relates to the separation of a mixed gas stream. More particularly, this disclosure relates to a method and system for the separation and purification of methane from landfill gases.

BACKGROUND

As household and other wastes gradually decompose in commercial landfills, significant quantities of gases are generated as decomposition products. These include hydrocarbons, particularly methane, as well as carbon dioxide, nitrogen, water vapor, and other gases and hydrocarbons. If captured and recovered from the landfill site, the methane generated during landfill decomposition represents a potentially valuable energy or feedstock source, particularly if the methane is refined or purified in such a manner as to meet the quality requirements to be accepted for delivery in natural gas pipelines to customers as a substitute for natural gas obtained from drilled natural gas wells.

To be combusted and used as an energy or feedstock source, however, the methane must first be separated from the other landfill gases and substantially purified. Therefore, there is a need for improved methods and systems to separate landfill gases, particularly methane, from other components of landfill gas streams so as to provide a substantially purified methane stream which may be either combusted and used as an energy source or used as a feedstock for the manufacture of other chemicals or substances.

SUMMARY

In a first aspect, the present disclosure provides a method for separating and purifying a landfill gas stream. In one embodiment, the method includes a step of collecting a crude landfill gas stream which includes at least methane, carbon dioxide, oxygen, and nitrogen gases. The method also includes a step of separating the crude landfill gas stream into at least an intermediate landfill gas stream and a first waste gas stream using a membrane separation unit, wherein the intermediate landfill gas stream is enriched in methane and depleted in carbon dioxide relative to the crude landfill gas stream. The method further includes a step of separating the intermediate landfill gas stream into at least a final landfill gas stream and a second waste gas stream using a pressure swing adsorption separation unit, wherein the final landfill gas stream is enriched in methane and depleted in carbon dioxide, oxygen, and nitrogen relative to the intermediate landfill gas stream.

In certain embodiments according to the present disclosure, the crude landfill gas stream preferably includes from about 45 to about 55 mole percent methane, from about 20 to about 40 mole percent carbon dioxide, and from about 5 to about 20 mole percent nitrogen. The final landfill gas stream preferably includes at least about 96 mole percent methane, no more than about 1 mole percent carbon dioxide, and no more than about 4 mole percent nitrogen.

In certain embodiments according to the present disclosure, the first waste gas stream includes volatile organic compounds, and the method preferably also includes a step of treating the first waste gas stream in a thermal oxidizer unit to substantially destroy the volatile organic compounds therein so that the first waste gas stream may be released into the atmosphere The second waste gas stream may also include volatile organic compounds, in other embodiments according to the present disclosure, and the method preferably also includes a step of treating the second waste gas stream in a thermal oxidizer unit to substantially destroy the volatile organic compounds therein so that the second waste gas stream may be released into the atmosphere.

In some embodiments according to the present disclosure, at least a portion of the crude landfill gas stream is separated into a first recycle gas stream using the membrane separation unit, and this first recycle gas stream is recombined with the crude landfill gas stream. In certain embodiments, this first recycle gas stream is preferably from about 30 to about 40 mole percent of the crude landfill gas stream.

In certain other embodiments according to the present disclosure, at least a portion of the intermediate landfill gas stream is separated into a second recycle gas stream using the pressure swing adsorption separation unit, and this second recycle gas stream is recombined with the crude landfill gas stream. In certain embodiments, the second recycle gas stream is preferably from about 17 to about 22 mole percent of the intermediate landfill gas stream.

In still other embodiments according to the present disclosure, the crude landfill gas stream may also include hydrogen sulfide gas or other compounds of sulfur. In these embodiments, the method preferably also includes a step of removing at least a portion of the hydrogen sulfide gas or other compounds of sulfur from the crude landfill gas stream before the crude landfill gas stream is separated using the membrane separation unit.

In certain embodiments according to the present disclosure, the crude landfill gas stream further includes oxygen, water vapor, and volatile organic compounds and wherein the final landfill gas stream is depleted in oxygen, water vapor, and volatile organic compounds relative to the crude landfill gas stream.

In another aspect, the present disclosure provides a system for separating and purifying a landfill gas stream. In one embodiment, the system includes a feed gas conduit in flow communication with a crude landfill gas stream which includes at least methane, carbon dioxide, oxygen, and nitrogen gases. The system also includes a membrane separation unit in flow communication with the feed gas conduit for separating the crude landfill gas stream into at least an intermediate landfill gas stream and a first waste gas stream, wherein the intermediate landfill gas stream is enriched in methane and depleted in carbon dioxide relative to the crude landfill gas stream. The system further includes a pressure swing adsorption separation unit in flow communication with the membrane separation unit for receiving the intermediate landfill gas stream therefrom and separating the intermediate landfill gas stream into at least a final landfill gas stream and a second waste gas stream, wherein the final landfill gas stream is enriched in methane and depleted in carbon dioxide, oxygen, and nitrogen relative to the intermediate landfill gas stream.

The system may also include a thermal oxidizer unit. In certain embodiments according to the present disclosure, the thermal oxidizer unit is preferably in flow communication with the membrane separation unit for receiving the first waste gas stream, which may include volatile organic compounds. The thermal oxidizer unit substantially destroys the volatile organic compounds in the first waste gas stream so that the first waste gas stream may be released into the atmosphere. In certain other embodiments according to the present disclosure, the thermal oxidizer unit is preferably in flow communication with the pressure swing adsorption unit for receiving the second waste gas stream, which may also include volatile organic compounds. The thermal oxidizer unit substantially destroys the volatile organic compounds in the second waste gas stream so that the second waste gas stream may be released into the atmosphere.

In certain embodiments according to the present disclosure, the system also includes a recycle conduit in flow communication with at least the membrane separation unit. At least a portion of the crude landfill gas stream is preferably separated into a first recycle gas stream using the membrane separation unit and this first recycle gas stream is recombined with the crude landfill gas stream via the recycle conduit. In certain embodiments, this first recycle gas stream is preferably from about 30 to about 40 mole percent of the crude landfill gas stream.

In certain embodiments according to the present disclosure, the system also includes a recycle conduit in flow communication with at least the pressure swing adsorption unit. At least a portion of the intermediate landfill gas stream is preferably separated into a second recycle gas stream using the pressure swing adsorption separation unit and this second recycle gas stream is recombined with the crude landfill gas stream via the recycle conduit. In certain embodiments, this second recycle gas stream is preferably from about 17 to about 22 mole percent of the intermediate landfill gas stream.

In certain embodiments according to the present disclosure, the crude landfill gas stream may also include hydrogen sulfide gas. In these embodiments, the system may also include a hydrogen sulfide separation unit in flow communication with the crude landfill gas stream for removing at least a portion of the hydrogen sulfide gas from the crude landfill gas stream before the crude landfill gas stream is separated using the membrane separation unit.

In another embodiment of the invention, the method includes a step of collecting a crude landfill gas stream which includes at least methane, carbon dioxide, oxygen, and nitrogen gases. The method also includes a step of separating the crude landfill gas stream into at least an intermediate landfill gas stream and a first waste gas stream using a membrane separation unit, wherein the intermediate landfill gas stream is enriched in methane and depleted in carbon dioxide relative to the crude landfill gas stream and the first waste gas stream is enriched in carbon dioxide and depleted in methane relative to the crude landfill gas stream. The method further includes a step of separating the intermediate landfill gas stream into at least a final landfill gas stream and a second waste gas stream using a pressure swing adsorption separation unit, wherein the final landfill gas stream is enriched in methane and depleted in carbon dioxide, oxygen, and nitrogen relative to the intermediate landfill gas stream and the second waste gas stream is enriched in carbon dioxide, oxygen, and nitrogen relative to the intermediate landfill gas stream. The method further includes collecting the first waste gas stream and the second waste gas stream to provide a fuel composition and delivering the fuel composition to a generator unit so that the fuel composition may be used to produce electricity.

In certain embodiments, at least a portion of the crude landfill gas stream is separated into a first recycle gas stream using the membrane separation unit and at least a portion of the first recycle gas stream is provided to the fuel composition. In other embodiments, at least a portion of the final landfill gas stream may be provided to the fuel composition with or without the first recycle gas stream.

In another aspect, the present disclosure provides a system for separating and purifying a landfill gas stream. In one embodiment, the system includes a feed gas conduit in flow communication with a crude landfill gas stream which includes at least methane, carbon dioxide, oxygen, and nitrogen gases. The system also includes a membrane separation unit in flow communication with the feed gas conduit for separating the crude landfill gas stream into at least an intermediate landfill gas stream and a first waste gas stream, wherein the intermediate landfill gas stream is enriched in methane and depleted in carbon dioxide relative to the crude landfill gas stream and the first waste gas stream is enriched in carbon dioxide and depleted in methane relative to the crude landfill gas stream. The system further includes a pressure swing adsorption separation unit in flow communication with the membrane separation unit for receiving the intermediate landfill gas stream therefrom and separating the intermediate landfill gas stream into at least a final landfill gas stream and a second waste gas stream, wherein the final landfill gas stream is enriched in methane and depleted in carbon dioxide, oxygen, and nitrogen relative to the intermediate landfill gas stream and the second waste gas stream is enriched in carbon dioxide, oxygen, and nitrogen relative to the intermediate landfill gas stream. The system further includes a generator unit in flow communication with the membrane separation unit and the pressure swing adsorption unit for receiving the first waste gas stream and the second waste gas stream to produce a fuel composition, wherein the generator unit burns the fuel composition to produce electricity In certain embodiments, the system further includes a recycle conduit in flow communication with the membrane separation unit and the generator unit, wherein at least a portion of the crude landfill gas stream is separated into a first recycle gas stream using the membrane separation unit and wherein at least a portion of the first recycle gas stream is provided to the fuel composition via the recycle conduit. In other embodiments, at least a portion of the final landfill gas stream may be provided to the fuel composition with or without the first recycle gas stream.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

The present disclosure provides a system and method for separating and purifying a crude landfill gas stream to recover a methane component therefrom. The crude landfill gas stream is created as a result of the decomposition of discarded waste materials in the landfill. After the crude landfill gas stream is processed according to the present disclosure, a final landfill gas stream is obtained which is primarily methane. The final landfill gas stream preferably meets a general standard or level of quality requirements and eligibility for common carrier natural gas pipeline transportation and may be accepted for delivery in natural gas pipelines to be redelivered to customers either alone or mixed with natural gas and as such to be combusted or otherwise used as a feedstock for manufacture of hydrocarbon products in substantially the same manner as natural gas obtained from drilled natural gas wells may be combusted or otherwise used.

The exact composition of the crude landfill gas stream will vary somewhat from one landfill site to another. In general, however, the crude landfill gas stream will include methane and possibly other hydrocarbon gases, carbon dioxide, and nitrogen, as well as oxygen and water vapor. In some instances, the crude landfill gas stream may also include hydrogen sulfide ($H_2S$) gas and/or volatile organic compounds (VOCs). A typical crude landfill gas stream may be composed of from about 45 to about 55 mole percent methane, from about 20 to about 40 mole percent carbon dioxide, from about 5 to about 20 mole percent nitrogen, from about 2 to about 5 mole percent oxygen, from about 0.01 to about 6 mole percent hydrogen sulfide, and from about 1 to about 2 mole percent VOCs. The crude landfill gas stream is also typically saturated with water vapor. When initially recovered from the landfill site, the crude landfill gas stream is typically at or below atmospheric pressure and is at ambient temperature in the gas collection system, which is typically about 140 of or less.

In the final landfill gas stream, it is desired to provide the methane in a substantially purified form. In some embodiments of the present disclosure, it is particularly preferred that the methane in the final landfill gas stream be provided as a "pipeline quality" gas product. A "pipeline quality" gas product is generally understood to mean gas treated to meet the specifications required and specified in various pipeline tariffs or schedules filed by governmentally regulated interstate or intrastate common carrier natural gas pipelines and distribution and utilities companies. The gas is typically processed prior to delivery to the pipeline to remove contaminating water, liquids, and other specified impurities. Thus, such "pipeline quality" gas in this case is a gas stream composed primarily of methane and having only a minimal amount of other gas components. The level of other gas components in a "pipeline quality" methane product is sufficiently low so that the methane stream may be introduced into and transported through commercial natural gas pipelines, intermixed with the natural gas therein, and sold as the equivalent of natural gas.

Accordingly, in certain embodiments according to the present disclosure, the final landfill gas stream is preferably composed of at least about 96 mole percent methane. Preferably the final landfill gas stream also includes no more than about 1 mole percent carbon dioxide, no more than about 4 mole percent nitrogen, no more than about 1 mole percent oxygen, no more than about seven pounds of entrained water per million cubic feet of gas, and no more than about 0.25 grains per hundred cubic feet of hydrogen sulfide (where 437.5 grains equal 1 avoirdupois ounce). The final landfill gas stream also preferably has an energy value of about 970 British Thermal Units (BTUs) per cubic foot of gas, as measured at standard temperature and pressure. (Unless otherwise noted, all gas volume measurements herein are referenced at standard temperature and pressure.) After separation and purification, the final landfill gas stream is preferably supplied at a pressure which is sufficient to overcome the existing operating pressure of the pipeline to which it is being delivered and to enter the transportation or distribution pipeline and at a temperature of from about 90 to about 110° F.

Figure 1:
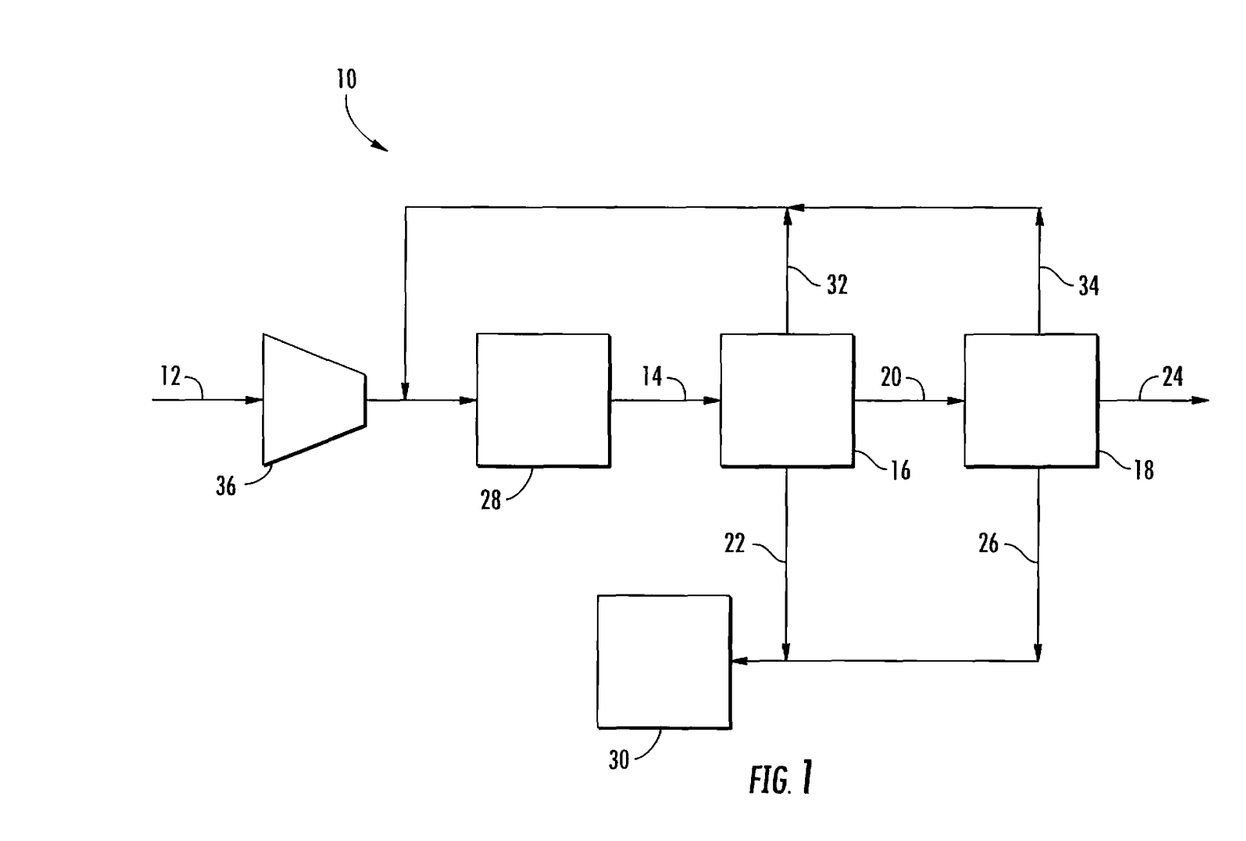
FIG. 1 is a process flowchart showing a landfill gas purification system according to one embodiment of the present disclosure.

The crude landfill gas is initially collected via a plurality of recovery wells. The gas recovery wells include a plurality of substantially vertical boreholes drilled or otherwise formed into the ground at various positions though the landfill. The boreholes are generally from about 50 feet to about 150 feet in depth and have a diameter of up to about one foot. The boreholes are typically provided in a predetermined pattern such that each borehole is positioned from about 75 feet to about 200 feet apart from the next adjacent borehole. Within each borehole is a substantially vertical pipe, which is generally referred to as a well casing. Each well casing preferably includes a plurality of perforations along a portion of the pipe, so that gas from the landfill can enter the casing from the landfill. A network of horizontal pipes on or near the surface of the landfill interconnects the well casings. A source of vacuum, such as vacuum pump, is connected in fluid flow communication with the piping network in order to extract methane and other gases from the landfill via the well casings. The crude landfill gas stream so obtained is then supplied to a purification system 10 via a feed gas conduit 12, as shown in FIG. 1.

Once recovered from the landfill wells, a crude landfill gas stream 14 may be separated and purified in a system which includes at least a feed gas conduit 12, a membrane separation unit 16, and a pressure swing adsorption unit 18. According to the present disclosure, the feed gas conduit 12 is in flow communication with the crude landfill gas stream 14. The membrane separation unit 16 is in flow communication with the feed gas conduit 12 and separates the crude landfill gas stream 14 into at least an intermediate landfill gas stream 20 and a first waste gas stream 22. The intermediate landfill gas stream 20 is enriched in methane and depleted in carbon dioxide relative to the crude landfill gas stream 14. The pressure swing adsorption unit 18 is in flow communication with the membrane separation unit 16 for receiving the intermediate landfill gas stream 20 therefrom. The pressure swing adsorption unit 18 separates the intermediate landfill gas stream 20 into at least a final landfill gas stream 24 and a second waste gas stream 26. The final landfill gas stream 24 is enriched in methane and depleted in carbon dioxide and nitrogen relative to the intermediate landfill gas stream 20. The system 10 may include a hydrogen sulfide separation unit 28 in flow communication with the crude landfill gas stream 14 for removing at least a portion of the hydrogen sulfide gas from the crude landfill gas stream 14 before the crude landfill gas stream 14 is enters the membrane separation unit 16. In addition, the system 10 may also include a thermal oxidizer unit 30 for destroying VOCs in the first and/or second waste gas streams 22, 26.

As noted above, if a substantial amount of hydrogen sulfide is present in the crude landfill gas stream 14, the system 10 may also include the hydrogen sulfide separation unit 28 which removes at least a portion of the hydrogen sulfide gas from the crude landfill gas stream 14. In addition to being toxic, hydrogen sulfide gas can also be corrosive, as those of skill in the art will appreciate. Accordingly, the hydrogen sulfide separation unit 28 is preferably positioned upstream of the membrane separation unit 16 and in flow communication with the crude landfill gas stream 14 to as to minimize the corrosive effects of hydrogen sulfide gas upon the remaining downstream processing equipment.

In general, the use of the hydrogen sulfide separation unit 28 in the system 10 is preferred if the crude landfill gas stream 14 includes more than about 5 parts per million (ppm) of hydrogen sulfide. The hydrogen sulfide separation unit 28 preferably removes at least about 99 percent of the hydrogen sulfide gas present in the crude landfill gas stream 14. Thus, after treatment in the hydrogen sulfide separation unit 28, the crude landfill gas stream 14 preferably includes no more than about 0.05 ppm of hydrogen sulfide. The hydrogen sulfide separation unit 28 is preferably sized in accordance with the flow rate of the crude landfill gas stream 14 to be treated.

The hydrogen sulfide separation unit 28 removes the hydrogen sulfide gas from the crude landfill gas stream 14 by introduction of the gas stream 14 in to a specialized pressure vessel contacting a bed of pellets which selectively chemically react with substantially only the hydrogen sulfide gas from the crude landfill gas stream 14 while allowing the remainder of the crude landfill gas stream 14 to pass through unaffected. The hydrogen sulfide is thus transferred to, and reacts with, the pellets which may in turn be safely disposed of following the chemical reaction.

An example of a suitable hydrogen sulfide separation unit 28 for use in accordance with the present disclosure is the SulfaTreat system, manufactured by M-I, L.L.C. of Chesterfield, Mo.

After the crude landfill gas stream 14 has been treated in the hydrogen sulfide separation unit 28 (if present), the gas stream is preferably compressed to a desired elevated pressure, typically about 200 psig, using a suitable gas compressor 36 in order to facilitate further processing of the gas downstream in the treatment system. Suitable compressors for this purpose may be electrically powered or gas powered and are widely known to persons of ordinary skill in the art.

The crude landfill gas stream 14 then passes through the feed gas conduit 12 and enters the membrane separation unit 16 which is in flow communication with the feed gas conduit 12. In general, the membrane separation unit 16 is used to remove a large portion of the carbon dioxide from the crude landfill gas stream 14. The membrane separation unit 16 may also remove water, dust and other solids, siloxanes, small quantities of hydrogen sulfide and VOCs from the landfill gas stream as well. In so doing, the membrane separation unit 16 separates the crude landfill gas stream 14 into at least two gas streams, the intermediate landfill gas stream 20 and the first waste gas stream 22. Relative to the crude landfill gas stream 14, the intermediate landfill gas stream 20 is enriched in methane and is depleted in carbon dioxide. On the other hand, the first waste gas stream 22 is relatively depleted in methane and enriched in carbon dioxide as compared to the crude landfill gas stream 14.

For example, the amount of methane in the crude landfill gas stream 14 may range from about 45 to about 55 mole percent and the amount of carbon dioxide may range from about 20 to about 40 mole percent. The amount of methane in the intermediate landfill gas stream 20 may range from about 70 to about 75 mole percent and the amount of carbon dioxide may range from about 0.5 to about 1.5 mole percent. The amount of methane in the first waste gas stream 22 may range from about 8 to about 12 mole percent and the amount of carbon dioxide may range from about 75 to about 85 mole percent.

The membrane separation unit 16 is typically skid mounted and is preferably sized in accordance with the flow rate of the crude landfill gas stream 14 to be treated. For example, a membrane separation unit 16 having a size of about 10 feet by about 35 feet (representing the size of the skid upon which the membranes and the associated mechanical components are mounted) may be suitable to treat a crude landfill gas stream 14 having a flow rate of about 2 million cubic feet per day.

In general, the membrane separation unit 16 removes carbon dioxide gas from the crude landfill gas stream 14 by use of a bundle of hollow fibers disposed within the membrane separation unit 16. The surface of each hollow fiber is made from a membrane material which may be readily permeated by carbon dioxide gas, oxygen gas, water vapor, and VOC gases. The membrane material is substantially less permeable to methane. As the crude landfill gas stream 14 flows through the membrane separation unit 16, it initially travels inside of the hollow fiber bundles. However, substantial amounts of carbon dioxide gas, oxygen gas, water vapor, and VOC gases permeate the membranes of the fibers. This permeate gas may be collected as the first waste gas stream 22. The methane and other gases which do not permeate through the membranes of the fibers may be separately collected as the intermediate landfill gas stream 20.

During this process, the membrane separation unit 16 is typically operated at an inlet pressure of from about 175 to about 225 psi and at a temperature of from about 100 to about 135° F.

An example of a suitable membrane separation unit 16 for use in accordance with the present disclosure is the BIOGAZ membrane system, available from Air Liquide—Medal of Newport, Del.

After the intermediate landfill gas stream 20 has been treated in the membrane separation unit 16, it then passes through a conduit and enters the pressure swing adsorption unit 18 which is in flow communication with the membrane separation unit 16. In general, the pressure swing adsorption unit 18 is used to remove additional carbon dioxide from the landfill gas stream as well as nitrogen. The pressure swing adsorption unit 18 may also remove oxygen from the landfill gas stream as well. In so doing, the pressure swing adsorption unit 18 separates the intermediate landfill gas stream 20 into at least two gas streams, the final landfill gas stream 24 and the second waste gas stream 26. Relative to the intermediate landfill gas stream 20, the final landfill gas stream 24 is enriched in methane and is depleted in carbon dioxide and nitrogen. On the other hand, the second waste gas stream 26 is relatively depleted in methane and enriched in carbon dioxide and nitrogen as compared to the intermediate landfill gas stream 20.

For example, as noted above, the amount of methane in the intermediate landfill gas stream 20 may range from about 70 to about 75 mole percent, the amount of carbon dioxide may range from about 0.5 to about 1.5 mole percent, and the amount of nitrogen may range from about 25 to about 30 mole percent.

The amount of methane in the final landfill gas stream 24 may range from about 95 to about 97 mole percent, the amount of carbon dioxide may range from about 0 to about 5 mole percent, and the amount of nitrogen may range from about 3 to about 4 mole percent. The amount of methane in the second waste gas stream 26 may range from about 20 to about 25 mole percent the amount of carbon dioxide may range from about 3 to about 5 mole percent, and the amount of nitrogen may range from about 70 to about 75 mole percent.

The pressure swing adsorption unit 18 is typically skid mounted and is preferably sized in accordance with the flow rate of the intermediate landfill gas stream 20 to be treated. For example, a pressure swing adsorption unit 18 having a size of about 8 feet by about 35 feet (representing the size of the skid upon which the unit and the associated mechanical components are mounted) may be suitable to treat an intermediate landfill gas stream 20 having a flow rate of about 1.25 million cubic feet per day.

The pressure swing adsorption unit 18 removes carbon dioxide and nitrogen gases from the intermediate landfill gas stream 20 using a plurality of fixed bed adsorption vessels.

The surfaces of the adsorbent have a multitude of microscopic pores which are sized such that relatively smaller molecules, such as carbon dioxide and diatomic nitrogen, may enter into the pores and become trapped therein; however, relatively large molecules, including in particular methane, are too large to enter into the pores or to become trapped. The methane thus passes through the adsorption vessel into the final landfill gas stream 24.

When the adsorbent bed eventually becomes saturated with carbon dioxide and/or nitrogen, the bed may be regenerated using vacuum and a flow of a purge gas. The gases collected from the regeneration process may be collected to provide the second waste gas steam.

The fixed bed adsorption vessels are typically each configured so as to be connected to the membrane separation unit 16 in a parallel arrangement. In this manner, one adsorption vessel may be regenerated while at least one other adsorption vessel remains in operation to process the intermediate landfill gas stream 20.

The pressure swing adsorption unit 18 is typically operated at an inlet pressure of from about 130 to about 150 psig and at a temperature of from about 100 of to about 150° F.

An example of a suitable pressure swing adsorption unit 18 for use in accordance with the present disclosure is the MOLECULAR GATE pressure swing adsorption system, available from Guild Associates, Inc. of Dublin, Ohio.

In some embodiments according to the present disclosure, the system may also include the thermal oxidizer unit 30. In particular, if the initial crude landfill gas stream 14 includes a substantial amount of VOCs, these VOCs may also be present in the first waste gas stream 22 and/or the second waste gas stream 26. In these instances, it is preferred that the system 10 include the thermal oxidizer 30 which is in flow communication with the membrane separation unit 16 and/or the pressure swing adsorption unit 18 so as to receive the first and/or second waste gas streams 22, 26 and substantially destroy the VOCs therein.

In general, the use of the thermal oxidizer unit 30 in the system is preferred if the concentration of VOCs in either of the first and second waste gas streams 22, 26 is sufficiently high to necessitate treatment prior to release of the gas into the atmosphere. The thermal oxidizer unit 30 preferably destroys at least about 98 percent of the VOCs present in the waste gas streams. With the level of VOCs so reduced, the first and for second waste gas streams 22, 26 may be released into the atmosphere.

The thermal oxidizer unit 30 is preferably sized in accordance with the flow rate of the waste gas stream or streams to be treated. For example, a thermal oxidizer unit 30 having a width of about 4.5 feet and a height of about 35 feet may be suitable to treat a waste gas stream having a flow rate of about 1.25 million cubic feet of waste gases per day.

The thermal oxidizer unit 30 is typically operated at a pressure of from about 100 to about 140 psi and at a system design temperature at which the desired VOC destruction ratios are achieved. Typically, the temperature is at least about 1600° F.

An example of a suitable thermal oxidizer unit 30 for use in accordance with the present disclosure is available from MRW Technologies, Inc. of Jenks, Okla.

In certain embodiments according to the present disclosure, the system 10 also includes one or more recycle conduits for recombining gases with the crude landfill gas stream 14. For instance, the system 10 may include a first recycle conduit in flow communication with at least the membrane separation unit 16. According to this embodiment, the membrane separation unit 16 separates the crude landfill gas stream 14 into at least three streams, a first recycle gas stream 32 and the aforementioned intermediate landfill gas stream 20 and first waste gas stream 22. The first recycle gas stream 32 is then recombined with the crude landfill gas stream 14 via the recycle conduit. In certain embodiments, this first recycle gas stream 32 is preferably from about 30 to about 40 mole percent of the crude landfill gas stream 14 entering the membrane separation unit 16.

In certain embodiments, the system 10 may include a second recycle conduit in flow communication with at least the pressure swing adsorption unit 18. According to this embodiment, the pressure swing adsorption unit 18 separates the intermediate landfill gas stream 20 into at least three streams, a second recycle gas stream 34 and the aforementioned final landfill gas stream 24 and second waste gas stream 26. The second recycle gas stream 34 is then recombined with the crude landfill gas stream 14 via the recycle conduit. In certain embodiments, this second recycle gas stream 34 is preferably from about 17 to about 22 mole percent of the intermediate landfill gas stream 20 entering the pressure swing adsorption unit 18.

As noted above, treatment of the crude landfill gas stream 14 according to the method and system of the present disclosure provides the final landfill gas steam 24 which is highly enriched in methane and has relatively low levels of other gas components. The final landfill gas stream 24 is preferably composed of at least about 96 mole percent methane. Preferably the final landfill gas stream 24 also includes no more than about 1 mole percent carbon dioxide, no more than about 4 mole percent nitrogen, no more than about 1 mole percent oxygen, no more than about seven pounds of entrained water per million cubic feet of gas, and no more than about 0.25 grains of hydrogen sulfide per hundred cubic feet of gas. The final landfill gas stream also preferably has an energy value of about 970 British Thermal Units (BTUs) per cubic foot of gas. Advantageously, in some embodiments of the present disclosure, the final landfill gas stream 24 may be provided as a "pipeline quality" methane product in compliance with the particularized requirements of the tariff or schedule applicable to the pipeline into which the methane product will be delivered. That is, the level of other gas components in the gas is sufficiently low so that the methane stream may be introduced into and transported through commercial natural gas pipelines and eventually sold as fungible with natural gas.

Figure 2:
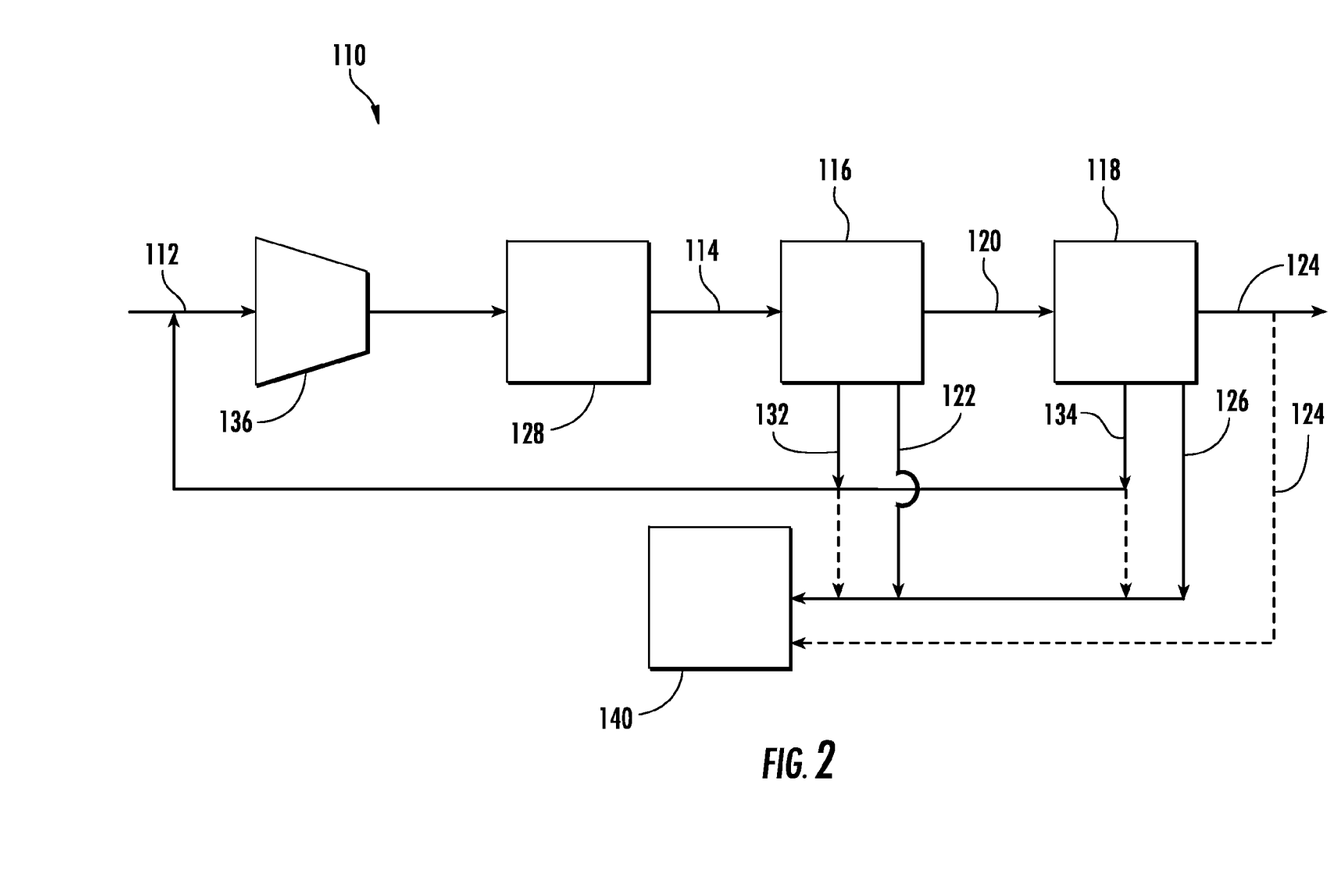
FIG. 2 is a process flowchart showing a landfill gas purification system including an electricity generating system according to one embodiment of the present invention.

In another embodiment of the invention, as shown in FIG. 2, the crude landfill gas stream is supplied to a purification system 110 via a feed gas conduit 112 in a similar fashion as the purification system 10 shown in FIG. 1. As described above, a crude landfill gas stream 114 may be separated and purified to produce a final landfill gas stream 124 in a system which includes at least the feed gas conduit 112, a membrane separation unit 116, and a pressure swing adsorption unit 118. In this embodiment, however, the system 110 is configured so that portions of the crude landfill gas traveling through the system 110 that does not end up being part of the final landfill gas stream 124 are used as fuel to produce electricity using a generator unit 140. The electricity may be used to help provide power to the purification system 110 for reducing operational costs and/or be sold to local power companies to provide an additional revenue source.

The feed gas conduit 112 is in flow communication with the crude landfill gas stream 114. The membrane separation unit 116 is in flow communication with the feed gas conduit 112 and separates the crude landfill gas stream 114 into at least an intermediate landfill gas stream 120 and a first waste gas stream 122. The intermediate landfill gas stream 120 is enriched in methane and depleted in carbon dioxide relative to the crude landfill gas stream 114, and the first waste gas stream 122 is depleted in methane and enriched in carbon dioxide relative to the crude landfill gas stream 114. For example, the amount of methane in the crude landfill gas stream 14 may range from about 45 to about 55 mole percent and the amount of carbon dioxide may range from about 20 to about 40 mole percent. The amount of methane in the intermediate landfill gas stream 120 may range from about 70 to about 75 mole percent and the amount of carbon dioxide may range from about 0.5 to about 1.5 mole percent. The amount of methane in the first waste gas stream 22 may range from about 8 to about 12 mole percent and the amount of carbon dioxide may range from about 75 to about 85 mole percent.

The pressure swing adsorption unit 118 is in flow communication with the membrane separation unit 116 for receiving the intermediate landfill gas stream 120 therefrom. The pressure swing adsorption unit 118 separates the intermediate landfill gas stream 120 into at least a final landfill gas stream 124 and a second waste gas stream 126. The final landfill gas stream 124 is enriched in methane and depleted in carbon dioxide and nitrogen relative to the intermediate landfill gas stream 120, and the second waste gas stream 126 is depleted in methane and enriched in carbon dioxide and nitrogen as compared to the intermediate landfill gas stream 120. For example, as noted above, the amount of methane in the intermediate landfill gas stream 120 may range from about 70 to about 75 mole percent, the amount of carbon dioxide may range from about 0.5 to about 1.5 mole percent, and the amount of nitrogen may range from about 25 to about 30 mole percent. The amount of methane in the final landfill gas stream 124 may range from about 95 to about 97 mole percent, the amount of carbon dioxide may range from about 0 to about 5 mole percent, and the amount of nitrogen may range from about 3 to about 4 mole percent. The amount of methane in the second waste gas stream 126 may range from about 20 to about 25 mole percent the amount of carbon dioxide may range from about 3 to about 5 mole percent, and the amount of nitrogen may range from about 70 to about 75 mole percent.

The system 110 may also include a hydrogen sulfide separation unit 128 in flow communication with the crude landfill gas stream 114 for removing at least a portion of the hydrogen sulfide gas from the crude landfill gas stream 114 before the crude landfill gas stream 114 enters the membrane separation unit 116. After the crude landfill gas stream 114 has been treated in the hydrogen sulfide separation unit 128 (if present), the gas stream is preferably compressed to a desired elevated pressure, typically about 200 psig, using a suitable gas compressor 136 in order to facilitate further processing of the gas downstream in the treatment system. In other embodiments, the crude landfill stream 114 may also be compressed using the gas compressor 136 before being treated in the hydrogen sulfide unit (as shown in FIG. 2).

In certain embodiments according to the present disclosure, the system 110 includes one or more recycle conduits for recombining gases with the crude landfill gas stream 114. For instance, the system 110 may include a first recycle conduit in flow communication with at least the membrane separation unit 116. According to this embodiment, the membrane separation unit 116 separates the crude landfill gas stream 114 into at least three streams, a first recycle gas stream 132 and the aforementioned intermediate landfill gas stream 120 and first waste gas stream 122. The first recycle gas stream 132 may then be recombined with the crude landfill gas stream 114 via the recycle conduit being in flow communication with the feed gas conduit 112. In certain embodiments, this first recycle gas stream 132 is preferably from about 30 to about 40 mole percent of the crude landfill gas stream 114 entering the membrane separation unit 116.

In certain embodiments, the system 110 may include a second recycle conduit in flow communication with at least the pressure swing adsorption unit 118. According to this embodiment, the pressure swing adsorption unit 118 separates the intermediate landfill gas stream 120 into at least three streams, a second recycle gas stream 134 and the aforementioned final landfill gas stream 124 and second waste gas stream 126. The second recycle gas stream 134 is then recombined with the crude landfill gas stream 114 via the recycle conduit being in flow communication with the feed gas conduit. In certain embodiments, this second recycle gas stream 134 is preferably from about 17 to about 22 mole percent of the intermediate landfill gas stream 120 entering the pressure swing adsorption unit 118.

In system 110, the thermal oxidizer unit 30 is preferably replaced with the generator unit 140. The generator unit 140 is in flow communication with the membrane separation unit 116 and/or the pressure swing adsorption unit 118 so as to receive the first and/or second waste gas streams 122,126 which are collected to provide a fuel composition to the generator unit 140 for producing electricity. In preferred embodiments, substantially all of the first waste stream 122 and the second waste stream 126 are included in the fuel composition so that the VOCs present in the waste streams may be destroyed.

Various generator units may be used in the system 110 to produce electricity from landfill gases. For example, internal combustion reciprocating engines, gas turbine engines, and fuel cell technology may be used to produce electricity from the fuel composition generated by the first and second waste gas streams 122, 126. In preferred embodiments, the generator unit 140 includes an internal combustion reciprocating engine that burns the fuel composition to provide power to a generator that creates electricity. As the fuel composition produced by combining the first and second waste gas streams 122, 126 is a relatively low-BTU methane relative to pipeline quality natural gas, the generator unit 140 of the present invention utilizes a low-BTU reciprocating engine. An example of a suitable generator unit 140 for use in accordance with the present disclosure is the Caterpillar® 3516 Propulsion Engine and accompanying generator set.

As most low-BTU reciprocating engines currently require fuel compositions of approximately 40 mole percent and above methane in order to run at full power, and 30-40 mole percent methane at slightly lower outputs, the fuel composition produced by the first and second waste gas streams 122, 126 may be methane enriched by adding any combination of at least a portion of the first recycle gas stream 132, the second recycle gas stream 134, and/or the final landfill gas stream 124.

In certain embodiments, the first and second waste gas streams 122, 126 are in flow communication with the generator unit 140 and produce the fuel composition. The first recycle stream 132 is in flow communication with both the generator unit 140 and the feed gas conduit 112. The second recycle stream 134 may also be in flow communication with both the generator unit 140 and the feed gas conduit 112. In other embodiments and as indicated by the dashed lines in FIG. 2, the first recycle stream 132 and/or the second recycle stream 134 may be in flow communication with only the generator unit 140 or only the feed gas conduit 112. In preferred embodiments, only the first recycle stream 132 is used if the fuel composition needs to be supplemented. However, in other embodiments, the first recycle stream 132 and the second recycle stream 134, or even just the second recycle stream 134, is added to the fuel composition produced by the first and second waste gas streams 122, 126.

To enrich the fuel composition used by the generator unit 140 to produce electricity, the final landfill gas stream 124 may also be in flow communication with the generator unit 140. Thus, the fuel composition produced by the first and second waste gas streams 122, 126 and the first and/or second recycle streams 132, 134 may be adjusted as desired by supplementing it with the methane enriched final landfill gas stream 124 to increase the productivity of the generator unit 140.

Thus, the fuel composition may be composed of any combination of the first waste stream 122, the second waste stream 126, the first recycle stream 132, and the second recycle stream 134, and the fuel composition produced by any of these streams may be supplemented using the final landfill gas stream 124 if desired. For example, while the fuel composition described above includes the first and second waste gas streams 122, 126, at least a portion of the first recycle stream 132, and possibly a portion of the final landfill gas stream 124, the fuel composition may only include the first and second waste gas streams 122, 126 and a portion of the final landfill gas stream 124. However, in this embodiment, more of the final landfill gas stream 124 would likely be necessary to enrich the fuel composition with enough methane to power the generator unit 140 at a productive output.

The following nonlimiting examples illustrate various additional aspects of the disclosure. Unless otherwise indicated, temperatures are in degrees Celsius and percentages are by weight based on the dry weight of the formulation.

Prophetic Example

In this example, the treatment of a crude landfill gas stream according to one embodiment of the present disclosure is simulated computationally. According to the simulation, a crude landfill gas stream is recovered from a landfill via a plurality of extraction wells. The initial composition of the crude landfill gas stream is about 45.1 mole percent methane, 36.07 mole percent carbon dioxide, 17.5 mole percent nitrogen, 1.33 mole percent oxygen, and a saturation amount of water vapor. The flow rate of the crude landfill gas stream is approximately 2.0 million cubic feet per day.

The crude landfill gas stream is compressed to a pressure of approximately 215 psig and then introduced into a BIOGAZ membrane system, from Air Liquide—Medal. After processing in the membrane separation unit, approximately 1.137 million cubic feet per day of the gas is collected as an intermediate landfill gas stream. The composition of the intermediate landfill gas stream is determined to be about 71.2 mole percent methane, 1 mole percent carbon dioxide, 27.15 mole percent nitrogen, and 0.62 mole percent oxygen. The intermediate landfill gas stream is substantially dry, i.e., no measurable water vapor. The remainder of the gas from the membrane separation unit is collected as a first waste gas stream.

The intermediate landfill gas stream is then treated in a MOLECULAR GATE pressure swing adsorption system, from Guild Associates, Inc. After processing in the pressure swing adsorption unit, approximately 0.72 million cubic feet per day of a final landfill gas stream is collected. The composition of the final landfill gas stream is determined to be about 96.19 mole percent methane, 3.00 mole percent nitrogen, and 0.81 mole percent oxygen. The final landfill gas stream includes substantially no carbon dioxide or water vapor. Based on its composition, the energy value of the final gas stream is determined to be about 972 BTUs per cubic foot. The final landfill gas stream thus obtained may be sold as a methane product which is equivalent to commercial natural gas. A second waste gas stream is also collected from the pressure swing adsorption unit.

The first and second waste gas streams are combined into 1.28 million cubic feet per day gas stream having a composition of approximately 15 mole percent methane, 57 mole percent carbon dioxide, 26 mole percent nitrogen, and 2 mole percent oxygen. This gas stream is then treated in a thermal oxidizer in order to destroy any VOCs therein.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for separating and purifying a landfill gas stream, the method comprising the steps of:
    collecting a crude landfill gas stream which includes at least methane, carbon dioxide, oxygen, and nitrogen gases;
    separating the crude landfill gas stream into at least an intermediate landfill gas stream and a first waste gas stream using a membrane separation unit, wherein the intermediate landfill gas stream is enriched in methane and depleted in carbon dioxide relative to the crude landfill gas stream and the first waste gas stream is enriched in carbon dioxide and depleted in methane relative to the crude landfill gas stream;
    separating the intermediate landfill gas stream into at least a final landfill gas stream and a second waste gas stream using a pressure swing adsorption separation unit, wherein the final landfill gas stream is enriched in methane and depleted in carbon dioxide, oxygen, and nitrogen relative to the intermediate landfill gas stream and the second waste gas stream is enriched in carbon dioxide, oxygen, and nitrogen relative to the intermediate landfill gas stream;
    collecting the first waste gas stream and the second waste gas stream to provide a fuel composition; and
    delivering the fuel composition to a generator unit so that the fuel composition may be used to produce electricity.

2. The method of claim 1, wherein the crude landfill gas stream comprises from about 45 to about 55 mole percent methane, from about 20 to about 40 mole percent carbon dioxide, and from about 5 to about 20 mole percent nitrogen.

3. The method of claim 1, wherein the final landfill gas stream comprises at least about 96 mole percent methane, no more than about 1 mole percent carbon dioxide, and no more than about 4 mole percent nitrogen.

4. The method of claim 1, wherein at least a portion of the crude landfill gas stream is separated into a first recycle gas stream using the membrane separation unit and wherein at least a portion of the first recycle gas stream is provided to the fuel composition.

5. The method of claim 4, wherein the first recycle gas stream comprises from about 30 to about 40 mole percent of the crude landfill gas stream.

6. The method of claim 4, wherein at least a portion of the final landfill gas stream is provided to the fuel composition.

7. The method of claim 1, wherein at least a portion of the intermediate landfill gas stream is separated into a second recycle gas stream using the pressure swing adsorption separation unit and wherein at least a portion of the second recycle gas stream is provided to the fuel composition.

8. The method of claim 6, wherein the second recycle gas stream comprises from about 17 to about 22 mole percent of the intermediate landfill gas stream.

9. The method of claim 1, wherein at least a portion of the final landfill gas stream is provided to the fuel composition.

10. The method of claim 1, wherein the crude landfill gas stream further includes hydrogen sulfide gas and wherein the method further comprising a step of removing at least a portion of the hydrogen sulfide gas from the crude landfill gas stream before the crude landfill gas stream is separated using the membrane separation unit.

11. The method of claim 1, wherein the crude landfill gas stream further includes oxygen, water vapor, and volatile organic compounds and wherein the final landfill gas stream is depleted in oxygen, water vapor, and volatile organic compounds relative to the crude landfill gas stream.

12. A system for separating and purifying a landfill gas stream comprising:
a feed gas conduit in flow communication with a crude landfill gas stream which includes at least methane, carbon dioxide, oxygen, and nitrogen gases;
a membrane separation unit in flow communication with the feed gas conduit for separating the crude landfill gas stream into at least an intermediate landfill gas stream and a first waste gas stream, wherein the intermediate landfill gas stream is enriched in methane and depleted in carbon dioxide relative to the crude landfill gas stream and the first waste gas stream is enriched in carbon dioxide and depleted in methane relative to the crude landfill gas stream;
a pressure swing adsorption separation unit in flow communication with the membrane separation unit for receiving the intermediate landfill gas stream therefrom and separating the intermediate landfill gas stream into at least a final landfill gas stream and a second waste gas stream, wherein the final landfill gas stream is enriched in methane and depleted in carbon dioxide, oxygen, and nitrogen relative to the intermediate landfill gas stream and the second waste gas stream is enriched in carbon dioxide, oxygen, and nitrogen relative to the intermediate landfill gas stream; and
a generator unit in flow communication with the membrane separation unit and the pressure swing adsorption unit for receiving at least a portion of at least one of the first waste gas stream and the second waste gas stream to produce a fuel composition, wherein the generator unit burns the fuel composition to produce electricity.

13. The system of claim 12, further comprising:
a first recycle conduit in flow communication with the membrane separation unit and the generator unit, wherein at least a portion of the crude landfill gas stream is separated into a first recycle gas stream using the membrane separation unit; and
a second recycle conduit in flow communication with the pressure swing adsorption unit and the generator unit, wherein at least a portion of the intermediate landfill gas stream is separated into a second recycle gas stream using the pressure swing adsorption separation unit,
wherein at least a portion of at least one of the first recycle gas stream and the second recycle gas stream is provided to the fuel composition via the first and second recycle conduits.

14. The system of claim 13, wherein at least a portion of the final landfill gas stream is provided to the fuel composition.

15. The system of claim 12, wherein at least a portion of the final landfill gas stream is provided to the fuel composition.

16. The system of claim 12, wherein the crude landfill gas stream comprises from about 45 to about 55 mole percent methane, from about 20 to about 40 mole percent carbon dioxide, and from about 5 to about 20 mole percent nitrogen.

17. The system of claim 12, wherein the final landfill gas stream comprises at least about 96 mole percent methane, no more than about 1 mole percent carbon dioxide, and no more than about 4 mole percent nitrogen.

18. The system of claim 12, further comprising a recycle conduit in flow communication with the membrane separation unit and the generator unit, wherein at least a portion of the crude landfill gas stream is separated into a first recycle gas stream using the membrane separation unit and wherein at least a portion of the first recycle gas stream is provided to the fuel composition via the recycle conduit.

19. The system of claim 18, wherein the first recycle gas stream comprises from about 30 to about 40 mole percent of the crude landfill gas stream.

20. The system of claim 18, wherein at least a portion of the final landfill gas stream is provided to the fuel composition.

21. The system of claim 12, further comprising a recycle conduit in flow communication with the pressure swing adsorption unit and the generator unit, wherein at least a portion of the intermediate landfill gas stream is separated into a second recycle gas stream using the pressure swing adsorption separation unit and wherein at least a portion of the second recycle gas stream is provided to the fuel composition via the recycle conduit.

22. The system of claim 21, wherein the second recycle gas stream comprises from about 17 to about 22 mole percent of the intermediate landfill gas stream.

23. The system of claim 12, wherein at least a portion of the final landfill gas stream is provided to the fuel composition.

24. The system of claim 12, wherein the crude landfill gas stream further includes hydrogen sulfide gas and wherein the system further comprises a hydrogen sulfide separation unit in flow communication with the crude landfill gas stream for removing at least a portion of the hydrogen sulfide gas from the crude landfill gas stream before the crude landfill gas stream is separated using the membrane separation unit.

25. The system of claim 12, wherein the crude landfill gas stream further includes oxygen, water vapor, and volatile organic compounds and wherein the final landfill gas stream is depleted in oxygen, water vapor, and volatile organic compounds relative to the crude landfill gas stream.

* * * * *